United States Patent Office 2,928,813
Patented Mar. 15, 1960

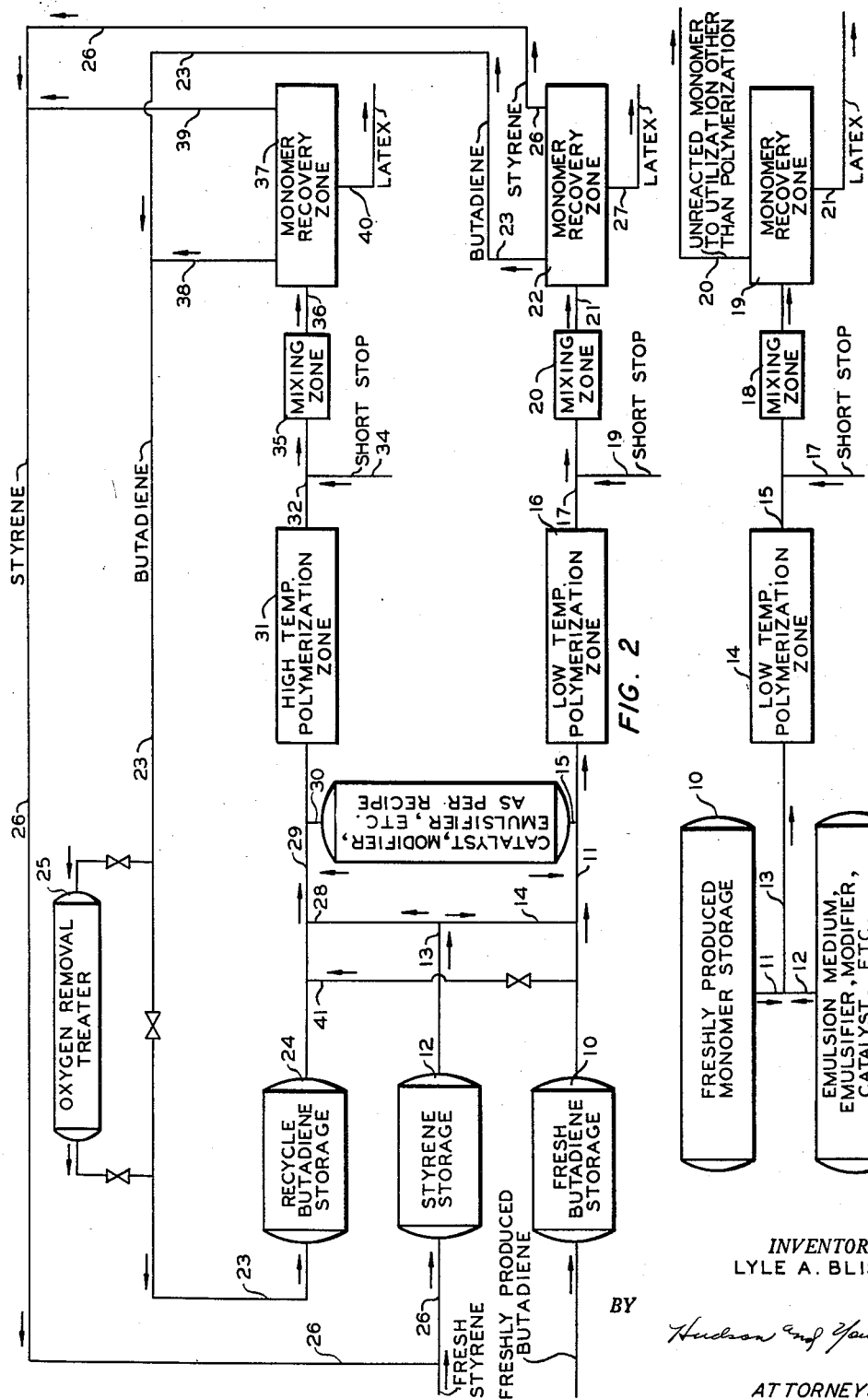

2,928,813

HIGH TEMPERATURE-LOW TEMPERATURE DIOLEFIN POLYMERIZATION PROCESS

Lyle A. Bliss, Borger, Tex., assignor to Phillips Petroleum Company, a corporation of Delaware Application November 12, 1954, Serial No. 468,357

13 Claims. (Cl. 260—83.7)

This invention relates to the manufacture of synthetic rubber. In one aspect this invention relates to the polymerization of at least one monomeric material containing an active $CH_2=C<$ group. In another aspect this invention relates to the polymerization of a monomeric material comprising a diolefin. In another aspect this invention relates to using only freshly produced diolefin, i.e., diolefin which has not previously been subjected to polymerizing conditions, in a polymerization process for the production of a low-temperature polymer. In another aspect this invention relates to a polymerization process for the production, with regularity, of latices which, when processed further, will yield a polymer having a desired Mooney viscosity, in which process only freshly produced diolefin, i.e., diolefin which has not previously been subjected to polymerizing conditions, is used for the production of a low-temperature polymer, and recovered unreacted diolefin which has been previously subjected to polymerizing conditions is used for the production of a high-temperature polymer. In another aspect this invention relates to polymerizing a butadiene according to said process. In still another aspect this invention relates to copolymerizing a butadiene with another monomeric material containing an active $CH_2=C<$ group, such as styrene, according to said process. Other aspects will be apparent from that which follows.

It is well known that butadienes, such as 1,3-butadiene and derivatives thereof, either alone or in admixture with other monomers containing a vinyl group, such as styrene, can be polymerized to produce synthetic rubber latices which can be coagulated to yield synthetic rubber. It is also well known that latices produced by polymerization at low temperatures yield synthetic rubbers which are superior in many respects to synthetic rubbers yielded from latices produced at high temperatures. A wide variety of both low-temperature synthetic rubbers (polymers) and high-temperature synthetic rubbers (polymers) have been produced from a great number of polymerization recipes and processes.

Throughout the specification and in the claims the term, polymer, includes both homo-polymers and co-polymers (inter-polymers).

It is customary in the production of both low-temperature polymers and high-temperature polymers to control the reaction period, i.e., the length of time the reactants are maintained under polymerizing conditions, so as to produce a latex which when processed further will yield a polymer having a predetermined desired Mooney viscosity. The Mooney value of rubber represents a determination of the plasticity or viscosity thereof. The value is determined by placing the material in the space between a rotating disk and stationary plates, the disk and the plates being provided with an array of sharp points. These roughened surfaces prevent slipping of the rubber and, when the disk is rotated, the shearing strength is determined. As the disk turns, the rubber exerts an opposing torque which is measured. ML–4 results are those obtained using the large (1½ inches) diameter rotor and a test time of 4 minutes. MS–4 results are those obtained using the small (1.2 inches) diameter rotor and a test time of 4 minutes. The small rotor is employed when exceedingly stiff rubbers or polymers are tested. The test instrument and the theory behind its operation are described in "Industrial and Engineering Chemistry, Analytical Edition," 6, 147 (1934). Obviously, the reaction period must be controlled in accordance with polymerization rate, i.e., the rate at which the polymerization reaction proceeds. For more active recipes the reaction period or time necessary to produce a desired extent of conversion is less, because of the higher polymerization rate, than for less active recipes. Frequently, however, for no readily apparent reason the rate of polymerization will change. Thus, one of the major difficulties in the control of the above described polymerization processes is knowing, when a change in the rate of polymerization occurs, when to short-stop the reaction so as to obtain the desired degree of conversion, i.e., a latex which when processed further will yield a polymer having the desired Mooney viscosity. When the reaction is not short-stopped at the proper time it is frequently necessary to discard the resulting polymers. When the reaction is short-stopped at the desired extent of conversion, unreacted monomer, or monomers, are present in the reaction mixture, which customarily, are recovered and recycled for re-use in the process.

I have found, in the production of low-temperature polymers, that the proportion of recycled diolefin in the stream of diolefin charged to the reaction zone has a marked and erratic effect upon the length of the reaction period necessary to produce a latex which when processed further will yield a polymer having a desired Mooney viscosity from a given polymerization recipe. I have also found that when only freshly produced diolefin, i.e., diolefin which has not previously been subjected to polymerizing conditions, is used for the production of low-temperature polymers, the reaction period necessary to produce a latex which when processed further will yield a polymer having a desired Mooney viscosity that is substantially uniform. Consequently a polymer having a desired Mooney viscosity can be obtained with regularity. The result is production of specification polymer with regularity.

Thus, according to the invention there is provided a polymerization process for the manufacture of a low-temperature polymer which comprises using only a freshly produced monomeric material containing an active $CH_2=C<$ group, to obtain with regularity a latex which, when processed further, will yield a polymer having a desired Mooney viscosity, in the production of said polymer.

Further according to the invention there is provided a unitary polymerization process as described above wherein used monomeric material containing an active $CH_2=C<$ group, e.g., recovered unreacted diolefin, is used for the production of a high-temperature polymer or copolymer.

In one embodiment of the invention only a freshly produced monomeric material comprising a diolefin, either alone or in admixture with another monomer, is subjected to low temperature polymerizing conditions in a polymerization reaction zone for the production of a low-temperature polymer or copolymer.

In another embodiment of the invention only a freshly produced monomeric material comprising a diolefin, either alone or in admixture with another monomer, is subjected to low temperature polymerizing conditions in a first polymerization reaction zone for the production of a low-temperature polymer or copolymer; and recovered unreacted diolefin is subjected to high temperature polymerizing conditions in a second polymerization reaction zone, either alone or in admixture with another monomer, for the production of a high-temperature polymer or copolymer.

In still another embodiment of the invention only freshly produced monomeric material comprising a diolefin is used for the production of a low-temperature polymer or copolymer as described and a mixture of recovered unreacted diolefin and freshly produced diolefin is subjected to a high temperature polymerizing conditions in said second polymerization reaction zone for the production of a high-temperature polymer or copolymer.

It is to be noted that in all of the above embodiments of the invention only freshly produced diolefin, i.e., diolefin which has not been previously subjected to polymerizing conditions is used for the production of low-temperature polymers or copolymers. By thus using only freshly produced diolefin polymers having a desired Mooney viscosity are obtained with regularity.

Throughout the specification and in the claims the term, recovered unreacted diolefin, means diolefin which has been subjected to reaction conditions, generally polymerizing conditions, in a conversion zone at least once and has been recovered from the reaction effluent from said conversion zone.

It is to be further noted that the invention is particularly adapted to and primarily intended to be used in plants which have already been started up and are in regular production. I realize that in starting up most polymerization plants probably only freshly produced diolefin would be used. However, prior to my invention it was customary in the art after the first few hours of operation of a plant to recycle recovered unreacted diolefin to the polymerization reaction zone, irrespective of whether low-temperature polymers or high-temperature polymers were being produced. As stated hereinabove it was frequently difficult, after the first few hours of operation, to obtain polymers having desired Mooney viscosity values with regularity, particularly in low temperature polymerization operations. By eliminating recycle of recovered unreacted diolefin to the low temperature polymerization zone my invention makes it possible to obtain, with regularity, latices which when processed further will yield polymers having desired Mooney viscosity values.

It is presently believed that varying concentrations of oxygen in the recycled recovered unreacted diolefin causes the reaction period for producing a latex, from which a low-temperature polymer of a given specification is to be produced, to vary considerably. It seems that oxygen exerts an inhibitory effect upon the polymerization reaction. The varying concentration of oxygen in the recycled diolefin is believed to be a result of air leaking into the equipment employed for recovering unreacted diolefin from the latex. Said recovery is effected under partial vacuum and it is difficult to maintain the equipment absolutely airtight at all times. Consequently the oxygen content of the recycled diolefin varies erratically. In a process using butadiene and styrene, due to the monomer recovery methods employed, the styrene usually does not contain sufficient dissolved oxygen to influence the polymerization reaction and the use of recycled styrene has little or no effect on the production of low-temperature polymers. Thus the invention is here described as applied in connection with the recycle of butadiene. However, the invention is applicable in those instances where the styrene or other monomer employed contains oxygen or other impurity which affects the reaction as described herein. It is not known why using recycled diolefin has only a relatively minor effect on the reaction period when the polymerization reaction is carried out at high temperature conditions.

Figure 1 illustrates diagrammatically one embodiment of the invention wherein only freshly-produced diolefin is used for the production of a low-temperature polymer.

Figure 2 illustrates diagrammatically other embodiments of the invention wherein both a low-temperature polymer and a high-temperature polymer are produced.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

The amount of emulsifying agent, reaction modifier, oxidant, activator, freezing point depressant, etc., and other ingredients to be used, depends upon the specific polymerization recipe used and the type of polymer desired, as will be understood by those skilled in the art. The polymerization may be conducted in batches, semi-continuously or continuously. The total pressure on the reactants is preferably at least as great as the total vapor pressure of the mixture, so that the initial reactants will be present in liquid phase. Usually 50 to 98 percent of the monomeric material is polymerized, depending upon when the reaction is short-stopped in accordance with the type of polymer desired.

The polymerization reaction can be carried out over a wide range of temperatures. The actual temperature employed will depend upon the polymerization recipe used and the type of polymer desired. However, for the purposes of this invention, the reactions can be divided generally into two groups (1) those carried out at low temperature conditions, and (2) those carried out at high temperature conditions. Herein, and in the claims, low temperature conditions refer to a temperature below 50° F., preferably below 44° F., and in some instances as low as −40° F. Thus, a low-temperature polymer is one produced from a latex formed by polymerizing a monomer at a temperature below 50° F. Herein, and in the claims, high temperature conditions refer to a temperature of 100° F. or higher. Thus, a high temperature polymer is one produced from a latex formed by polymerizing a monomer at a temperature of 100° F., or higher.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl - 1,3 - butadiene, isoprene, piperylene, 3-furyl - 1,3 - butadiene, 3-methoxy-1,3-butadiene and the like; haloprenes, such as chloroprene (2-chloro - 1,3 - butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinyl-ethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Often preferred as reactants are conjugated dienes having not more than six carbon atoms per molecule. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

Referring now to the drawings, the invention will be more fully explained.

In Figure 1, when operating in a continuous manner, freshly produced monomer, such as 1,3-butadiene is passed from monomer storage 10 through line 11, and is admixed in line 13 with emulsion medium, emulsifier, modifier, etc., according to the particular recipe being employed and passed into low temperature polymerization zone 14. In zone 14 the monomer and other materials admixed therewith as per the chosen recipe are maintained under low temperature polymerizing conditions for a period of time (reaction period) sufficient to produce a latex which when processed further will yield a low-temperature polymer having a desired Mooney viscosity. Latex containing some unreacted monomer is withdrawn from zone 14 through line 15, wherein a suitable short-stopping agent is added through line 17, and then passed into mixing zone 18. Latex from mixing zone 18 is then passed to monomer recovery zone 19 wherein recovery of unreacted monomer is effected by flash vaporization at reduced pressure and/or by steam stripping. Recovered unreacted monomer is removed from recovery zone 19 through line 20 to storage for utilization other than polymerization for the production of a low-temperature polymer. Latex free of unreacted monomer is withdrawn through line 21 and processed further by conventional methods for the production of a low-temperature polymer having a desired Mooney viscosity. The process of Figure 1 has been described as continuous. However, it should be realized that the process can be carried out semi-continuous or batchwise as will be understood by those skilled in the art. Figure 1 has been described as a polymerization process wherein only one monomer is polymerized; it should be understood that copolymerization with other monomers, such as styrene, can be carried out according to the process of Figure 1. In such instances the other monomer would be added in an amount according to the particular recipe employed through line 11 from a source not shown and recovered unreacted other monomer would be withdrawn from recovery zone 19 through a line (not shown) other than lines 20 and 21. Figure 2 illustrates several embodiments of the invention wherein such copolymerization is carried out.

Figure 2 illustrates diagrammatically the flow in a plant wherein both low-temperature polymers and high-temperature polymers can be produced. In the production of a low-temperature copolymer, such as from butadiene (1,3-butadiene) and styrene, freshly produced butadiene, i.e., butadiene which has not previously been subjected to polymerizing conditions is withdrawn from storage 10 and passed through line 11 wherein it is admixed with styrene passed from storage 12 through lines 13 and 14 into line 11. Emulsion medium, emulsifier, modifier, catalyst, etc., as per recipe, are introduced into said admixture in line 11 through line 15 and said admixture is then introduced into low temperature polymerization zone 16. In low temperature polymerization zone 16 said admixture of monomers and other ingredients added as per the chosen recipe are maintained under low temperature polymerizing conditions for a period of time (reaction period) sufficient to produce a latex which when processed further will yield a low-temperature copolymer having a desired Mooney viscosity. Latex containing some unreacted monomers is withdrawn from polymerization zone 16 through line 17, wherein a suitable short-stopping agent is added through line 19, and then passed into mixing zone 20. Latex from mixing zone 20 is passed through line 21 into monomer recovery zone 22 wherein recovery of unreacted monomers is effected. Recovered unreacted butadiene is removed from recovery zone 22 through line 23 and passed into recycle butadiene storage 24. If desired, said recovered unreacted butadiene may be passed through treating zone 25, by means of the by-pass arrangement shown, wherein it is contacted with a suitable oxygen-removing agent prior to being passed to recycle butadiene storage 24. Recovered unreacted styrene is removed from recovery zone 22 through line 26 and passed into styrene storage 12. Latex free of unreacted monomers is withdrawn from recovery zone 22 through line 27 and processed further by conventional methods for the production of a low-temperature copolymer having a desired Mooney viscosity.

In the production of a high-temperature copolymer styrene is passed from storage 12 through lines 13 and 28 into line 29 wherein it is mixed with recovered unreacted butadiene from storage 24. Emulsion medium, emulsifier, modifier, catalyst, etc., as per recipe are passed through line 30 into line 29 and therein mixed with said monomers and the resulting admixture passed into high temperature polymerization zone 31. In polymerization zone 31 said monomers and other materials admixed therewith as per the chosen recipe are maintained under high temperature polymerizing conditions for a period of time (reaction) sufficient to produce a latex which when processed further will yield a high-temperature copolymer having a desired Mooney viscosity. Latex containing some unreacted monomers is withdrawn from polymerization zone 31 through line 32, wherein a suitable short-stopping agent is added through line 34 and then passed through mixing zone 35 and line 36 into monomer recovery zone 37 wherein recovery of butadiene and styrene is effected in substantially the same manner as described for recovery zone 22. Recovered unreacted butadiene is removed from recovery zone 37 through line 38 and line 23 into recycle butadiene storage 24. Recovered unreacted styrene is removed from recovery zone 37 through lines 39 and 26 into styrene storage 12. Latex free of unreacted monomers is withdrawn from recovery zone 37 through line 40 and processed further by conventional methods for the production of a high-temperature copolymer having a desired Mooney viscosity. It is to be noted that all of the recycle butadiene from both the low temperature polymerization zone and the high temperature polymerization zone is returned to recycle butadiene storage 24 and thereafter used only in the production of high temperature copolymers. Only freshly produced butadiene from storage 10 is used in the production of the low temperature copolymers.

In another embodiment of the invention, if desired, a mixture of freshly produced butadiene and recycle butadiene can be used in the production of the high temperature copolymers. In such instances, fresh butadiene from storage 10 is passed through lines 11 and 41 into line 29 for further processing, as described.

In commercial operation, it is desirable to operate with substantially constant reaction periods. Consequently, it is customary to vary the amount of oxidant and activator used in order to maintain the polymerization rate at the desired level. Similarly, it is desirable to operate for a constant conversion during a given reaction period. Accordingly, it is customary to vary the modifier to obtain a latex at the desired conversion, which, when processed further, will yield a polymer having a desired Mooney viscosity (ML–4). The interdependence of these variables will be understood by those skilled in the art.

Some of the advantages of this invention are illustrated by the following examples. The reactants, and their proportions, and the other specific ingredients of the recipes, are presented as being typical and should not be construed to limit the invention unduly.

EXAMPLE I

A series of laboratory low temperature polymerization runs was made to determine the effect on reaction period of oxygen content in the butadiene. The basic polymerization recipe employed was as follows:

Ingredient:                                      Parts/100 parts monomers
Butadiene (100% basis) _____  72
Styrene (100% basis) _____  28
Water (total) _____ 200
Dresinate 214 (a potassium rosin soap) _____  4.5
Potassium chloride _____  0.5
Tamol N [1] _____ 0.15
Versene Fe–3 [1] _____ 0.005
Ferrous sulfate heptahydrate _____   0.2
Potassium pyrophosphate _____   0.25
Paramenthane hydroperoxide _____   0.1
Sulfole (tert-dodecyl mercaptan) _____ Variable

[1] See footnotes for Table IV.

The soap solution was charged to the reactor followed by the monomers, mercaptan and oxidant. The other water soluble ingredients were charged with the soap solution. The temperature was adjusted to 41° F. and the activator composition introduced. During the polymerization, the temperature was held at 41° F. Table I, given below, summarizes the results of these runs.

The term "initiator" is used herein, in accordance with commercial practice, to refer to both the amount of oxidant (hydroperoxide) and the amount of activator (ferrous sulphate and potassium pyrophosphate) used. The various recipes specify an amount, i.e., parts per 100 parts of monomers, of oxidant and activator to be used. Therefore, in the examples, the term "initiator level" given in percent, refers to the amount of oxidant and activator used with reference to the amount specified by the recipe. For example, an initiator level of 50 percent means that 50 percent of the amount specified for each by the recipe was used.

Table I
EFFECT OF OXYGEN ON REACTION PERIOD LOW TEMPERATURE POLYMERIZATION

| Run No. | p.p.m. $O_2$ in Butadiene | Hours to 60% Conversion | Initiator Level, Percent |
| --- | --- | --- | --- |
| 1 | 0 | 10.0 | 50 |
| 2 | 28 | 12.5 | 50 |
| 3 | 56 | 16.2 | 50 |
| 4 | 83 | 21.5 | 50 |
| 5 | 0 | 5.7 | 100 |
| 6 | 140 | [1] 12.5 | 100 |

[1] Extrapolated value.

It is to be noted that in runs 1, 2, 3 and 4, the amount of initiator used was maintained constant at 50 percent of the amount specified by the basic polymerization recipe. A comparison of runs 1, 2, 3 and 4 shows that as the parts per million oxygen in the butadiene increases, the time required to attain 60 percent conversion increases. A comparison of runs 1 and 6 shows that when the parts per million oxygen in the butadiene is increased from 0 to 140, twice as much initiator is required to obtain 60 percent conversion in the same length of time. Runs 1 and 5 show the effect of initiator concentration on the time necessary to attain 60 percent conversion.

EXAMPLE II

Two laboratory high temperature polymerization runs were made to determine the effect on reaction period of oxygen content in the butadiene. The basic polymerization recipe employed was as follows:

Ingredient:                                      Parts/100 parts monomers
Butadiene (100% basis) _____  71
Styrene (100%) basis _____  29
Water _____ 180
Sodium fatty acid soap _____   4.3
Potassium persulfate _____ 0.3 maximum
DDM (dodecyl mercaptan) _____ As required The soap solution was charged to the reactor followed by the monomers and mercaptan. The temperature was adjusted to 117° F. and the catalyst (persulfate) introduced. During the polymerization, the temperature was held at 117° F. Table II, given below, summarizes the results of these runs.

Table II
EFFECT OF OXYGEN ON REACTION PERIOD HIGH TEMPERATURE POLYMERIZATION

| Run No. | p.p.m. $O_2$ in Butadiene | Hours to 60% Conversion | Initiator Level |
| --- | --- | --- | --- |
| 7 | 0 | 11.7 | 0.23 part Catalyst. |
| 8 | 140 | 12.8 | Do. |

A comparison of runs 7 and 8 shows that increasing the amount of oxygen in the butadiene from 0 to 140 parts per million has only a minor effect on the time required to attain 60 percent conversion.

EXAMPLE III

A series of plant runs in a commercially operating copolymer plant was then made using only freshly prepared butadiene according to the invention. These runs are grouped into "test periods," a large number of batches of polymer being made during each test period. Table III, given below, summarizes and compares the results for the test periods when fresh butadiene was used with results obtained when blends of fresh butadiene and recycle butadiene were used.

Table III
PLANT DATA—LOW TEMPERATURE POLYMERIZATION DATA

| Test Period | Type Butadiene | Average Oxygen in Butadiene, p.p.m. Before Scrubbing | Average Oxygen in Butadiene, p.p.m. After Scrubbing | Polymer Recipe [2] | Number of Batches | Average Initiator Level, Percent | Initiator Range, Percent |
|---|---|---|---|---|---|---|---|
| 1 | Blend [1] | 56 | 9 | 1 | 633 | 89.8 | 40–150 |
| 2 | ...do [1] | 56 | 9 | 2 | 206 | 89.2 | 50–130 |
| 3 | ...do [1] | 66 | 14 | 1 | 697 | 66.2 | 30–130 |
| 4 | ...do [1] | 59 | 12 | 1 | 732 | 53.1 | 30–85 |
| 5 | ...do [1] | 58 | 16 | 1 | 305 | 96.3 | 60–130 |
| Avg | ...do | | 12.8 | | | 78.9 | 42–125 |
| 6 | Fresh | | 5.5 | 1 | 780 | 62.0 | 20–110 |
| 7 | ...do | | 0 | 1 | 738 | 43.3 | 25–75 |
| 8 | ...do | | 0 | 3 | 689 | 50.3 | 25–80 |
| 9 | ...do | | 0 | 1 | 256 | 34.2 | 25–50 |
| Avg | ...do | | 1.4 | | | 47.5 | 24–79 |

[1] Composition of blend varied from approximately 25 to approximately 40 percent recycle butadiene, the remainder of the blend being fresh butadiene.
[2] The basic polymerization recipes employed during the plant runs are given in Table IV below.

Table IV
BASIC POLYMERIZATION RECIPES EMPLOYED IN PLANT TESTS OF TABLE III

| Ingredient | Parts per 100 parts monomers | | |
|---|---|---|---|
| | Recipe No. 1 | Recipe No. 2 | Recipe No. 3 |
| Butadiene (100% basis) | 72 | 70 | 72 |
| Styrene (100% basis) | 28 | 30 | 28 |
| Water | 180–200 | 180–200 | 180–200 |
| Potassium rosin soap | 4.5 | 4.5 | 2.25 |
| Potassium fatty acid soap | | | 2.25 |
| Potassium chloride | 0.8 | 0.8 | 0.8 |
| Tamol N [1] | 0.15 | 0.15 | 0.15 |
| Versene Fe-3 [2] | 0.02 | 0.02 | 0.02 |
| Ferrous sulfate heptahydrate | 0.2 | 0.2 | 0.2 |
| Potassium pyrophosphate | 0.25 | 0.25 | 0.25 |
| Paramenthane hydroperoxide | 0.1 | 0.1 | 0.1 |
| Sulfole (tert-dodecyl mercaptan) | As required. | As required. | As required. |

[1] The sodium salt of a naphthalene sulfonic acid conditioned with formaldehyde.
[2] The tetra-sodium salt of ethylene diamine tetra-acetic acid.

An examination of the data given in Table III shows that during test periods 1 to 5 when a blend of fresh butadiene and recovered unreacted butadiene was used, the amount of initiator used was 78.9 percent of the maximum specified by the basic polymerization formulas as compared to 47.5 percent when only fresh butadiene was used.

The range of the amount of initiator used in Table III should also be noted. The data shows that, on the average, the amount of initiator used when blended butadiene was used ranged from 42 to 125 percent of the maximum specified by the basic polymerization formulas. When only fresh butadiene was used, the amount of initiator used ranged from 24 to 79 percent. Thus, not only was there a reduction in the amount of initiator used when only fresh butadiene was used, there was also a reduction in the "spread" on the initiator range; 83 when the blended butadiene was used, and 55 when only fresh butadiene was used. Initiator compounds are expensive and the above reduction in the quantities of initiator compounds used represent important savings. However, an even more important advantage is the increased uniformity of polymer product which results from (1) the decrease in the amount of initiator used per batch, and (2) the decrease in the range of initiator used from batch to batch, i.e., the reduction in "spread."

As stated it is desirable in commercial operation to operate with substantially constant reaction periods and to obtain a constant conversion during a given reaction period. When the recycle monomer contains oxygen which apparently inhibits the polymerization reaction it is extremely difficult to know how much oxidant and activator (initiator) to add in order to cause the reaction to proceed at the desired rate. Also, when the reaction rate is erratic it is difficult to know how much modifier to use to obtain the correct Mooney value at the desired conversion and when to short-stop the reaction. When the oxygen content varies erratically it is sometimes necessary to discard batches of polymer because it is off specification. When not actually off specification the quality of the polymer produced is sometimes below the quality of that produced when the reaction rate and conversion are proceeding smoothly. In other words the optimum results are obtained when the amounts of ingredients specified in the various recipes are adhered to as closely as possible. Thus, the important advantages resulting from the decrease in "spread" on the initiator range will be readily understood and appreciated by those skilled in the art.

It will be seen from the above data that operation of a copolymer plant according to the invention results in important advantages from both a product quality standpoint and an economic standpoint. These and other advantages not specifically discussed will be readily understood and appreciated by those skilled in the art.

Reasonable variation and modification are possible within the scope of the foregoing disclosure, the drawings and the appended claims to the invention, the essence of which is a polymerization process for the manufacture of a low temperature polymer, or copolymer, which comprises using only a freshly produced monomeric material containing an active $CH_2{=}C{<}$ group, such as 1,3-butadiene, to obtain with regularity a latex which when processed further, will yield a polymer, or copolymer, having a desired Mooney viscosity; and a unitary polymerization process, as described, wherein used monomeric material containing an active $CH_2{=}C{<}$ group, e.g., recovered unreacted diolefin such as 1,3-butadiene, is used for the production of high temperature polymer or copolymer.

I claim:

1. In the operation of a plant which has been started up and wherein a low-temperature polymer is produced by polymerizing in a low temperature polymerization zone under polymerizing conditions a diolefin monomeric material containing an active $CH_2{=}C{<}$ group, a high-temperature polymer is produced by polymerizing in a high temperature polymerization zone under polymerizing conditions another portion of said monomeric material, and wherein there results in both of said zones unreacted diolefin which is recovered and recycled to both of said zones, the improved method of operation of using only diolefin which has not been previously subjected to polymerizing conditions for the production of said low-temperature polymer, and recycling said recovered unreacted diolefin to said high temperature polymerization zone only.

2. In a process carried out in a plant which has been started up and wherein both a low-temperature and a high-temperature polymer are produced by polymerizing under polymerizing conditions a diolefin monomeric material containing an active $CH_2=C<$ group, and there results unreacted diolefin which is recovered and which is normally recycled for use in the production of both said low-temperature polymer and said high-temperature polymer, and wherein it is desired to obtain latices which when processed further will yield a polymer having a predetermined Mooney viscosity, with regularity, the improvement of using only diolefin which has not been previously subjected to polymerizing conditions for the production of said low-temperature polymer and recycling said recovered unreacted diolefin for the production of said high-temperature polymer only.

3. In a process for the manufacture of a low-temperature polymer and a high-temperature polymer by polymerization of a diolefin monomeric material containing an active $CH_2=C<$ group, which process is carried out in a plant which has been started up, and wherein a portion of said diolefin is polymerized under polymerization conditions in a low temperature reaction zone to produce a first reaction mixture from which there are recovered a low-temperature polymer and unreacted diolefin; another portion of said diolefin is polymerized under polymerization conditions in a high temperature reaction zone to produce a second reaction mixture from which there are recovered a high-temperature polymer and unreacted diolefin, the improvement of recycling said unreacted diolefin recovered from both of said reaction mixtures to said high temperature reaction zone only.

4. A process according to claim 3 wherein said diolefin which is polymerized in said low temperature reaction zone is a freshly produced diolefin which has not been previously subjected to polymerizing conditions and wherein said diolefin which is polymerized in said high temperature reaction zone is a mixture of said freshly produced diolefin and said unreacted diolefin recovered from said reaction zones.

5. A process according to claim 3 wherein said diolefin which is polymerized in said low temperature reaction zone is a freshly produced diolefin which has not been previously subjected to polymerizing conditions and wherein said diolefin which is polymerized in said high temperature reaction zone is unreacted diolefin recovered from said reaction zones.

6. A process according to claim 3 wherein said diolefin is a butadiene.

7. A process according to claim 6 wherein said butadiene is 1,3-butadiene.

8. In a process carried out in a plant which has been started up and wherein both a low-temperature copolymer and a high-temperature copolymer are produced by copolymerizing a diolefin with another monomer containing an active $CH_2=C<$ group selected from the group consisting of: conjugated butadienes; haloprenes; aryl olefins; acrylic and substituted acrylic acids and esters, nitriles and amides thereof; methyl isopropenyl ketone; methyl vinyl ketone; methyl vinyl ether; vinylethinyl alkyl carbinols; vinyl acetate; vinyl chloride; vinylidene chloride; vinylfurane; vinylcarbazole; vinylacetylene; and mixtures thereof; under copolymerizing conditions and wherein there results unreacted diolefin which is recovered and which is normally recycled for use in the production of both said low-temperature copolymer and said high-temperature copolymer, the improvement of using freshly produced diolefin which has not been subjected to polymerizing conditions for the production of said low-temperature copolymer and recycling said recovered unreacted diolefin for the production of said high-temperature copolymer only.

9. A process according to claim 8 wherein said diolefin is a butadiene.

10. A process according to claim 9 wherein said butadiene is 1,3-butadiene.

11. A process according to claim 8 wherein said diolefin is a butadiene and said another monomer is styrene.

12. A process according to claim 11 wherein said butadiene is 1,3-butadiene and said another monomer is styrene.

13. In the operation of a plant which has been started up and wherein: a low-temperature copolymer is produced by copolymerizing 1,3-butadiene with styrene in a low-temperature copolymerization zone under copolymerizing conditions; a high temperature copolymer is produced by copolymerizing 1,3-butadiene with styrene in a high temperature copolymerization zone under copolymerizing conditions; and wherein there results in both of said zones unreacted 1,3-butadiene which is recovered and recycled to both of said zones, the improved method of operation of: using only 1,3-butadiene which has not been previously subjected to polymerizing conditions for the production of said low-temperature copolymer, and recycling said recovered unreacted 1,3-butadiene to said high temperature copolymerization zone only.

References Cited in the file of this patent

UNITED STATES PATENTS

| | | |
|---|---|---|
| 2,556,851 | Ohsol et al. | June 12, 1951 |
| 2,609,362 | Fryling et al. | Sept. 2, 1952 |

OTHER REFERENCES

Shearon, Jr., et al.: "Ind. and Eng. Chem.," volume 40, No. 5, pages 769–777, May 1948.